United States Patent [19]

Zeanwick

[11] 4,333,745
[45] Jun. 8, 1982

[54] WORKBENCH FILTERING STATION AND METHOD

[75] Inventor: Ernest J. Zeanwick, Muskegon, Mich.

[73] Assignee: Textron, Inc., Providence, R.I.

[21] Appl. No.: 211,257

[22] Filed: Nov. 28, 1980

[51] Int. Cl.³ .................. B01D 46/02; F24F 3/16
[52] U.S. Cl. .......................... 55/97; 55/379; 55/414; 55/426; 55/432; 55/472; 55/485; 55/385 A; 55/DIG. 18; 98/115 R; 51/270; 51/273
[58] Field of Search .......... 55/21, 97, 379, 414, 55/415, 426, 431, 432, 472, 482, 485, 385 A, DIG. 18, 419; 98/115 R; 51/268, 270, 273, 274

[56] References Cited

U.S. PATENT DOCUMENTS

| | | | |
|---|---|---|---|
| 1,012,122 | 12/1911 | Budil | 55/379 |
| 2,715,359 | 8/1955 | Mackintosh et al. | 55/DIG. 18 |
| 2,906,371 | 9/1959 | Jones | 55/379 |
| 3,251,177 | 5/1966 | Baker | 55/385 A |
| 3,295,298 | 1/1967 | Mackey | 55/305 |
| 3,301,167 | 1/1967 | Howard et al. | 55/DIG. 18 |
| 3,381,453 | 5/1968 | Dills | 55/485 |
| 3,421,666 | 1/1969 | Lawson | 55/432 |
| 3,733,790 | 5/1973 | Pierce | 55/324 |
| 3,828,530 | 8/1974 | Peters | 55/473 |
| 3,838,556 | 10/1974 | Finger | 55/414 |
| 3,899,311 | 8/1975 | Rapp | 55/431 |
| 3,936,284 | 2/1976 | Mason | 55/274 |
| 3,960,527 | 6/1976 | Goettl | 55/419 |
| 4,016,809 | 4/1977 | Austin | 98/115 LH |
| 4,149,861 | 4/1979 | Sogo et al. | 55/426 |

FOREIGN PATENT DOCUMENTS 52-44469 4/1977 Japan .................. 55/482

OTHER PUBLICATIONS

Wolverine Equipment Division Publication, "Smoke Filter System", Foundries Materials Co.
Wolverine Equipment Division Publication, "Grinding Bench", Foundries Materials Co.
Wolvering Equipment Division Publication, "BT Bench Design", Foundries Materials Co.
Wolverine Equipment Division Publication, "Cabinet Collector", Foundries Materials Co.
Wolverine Equipment Division Publication, "Shaker Bag House", Foundries Materials Co.
Wolverine Equipment Division Publication, "Cloth Bag Bench", Foundries Materials Co.
Wolverine Equipment Division Publication, "Welding/Smoke Bench", Foundries Materials Co.

Primary Examiner—David L. Lacey
Attorney, Agent, or Firm—Varnum, Riddering, Wierengo & Christenson

[57] ABSTRACT

A workbench filtering station (10) includes a generally open interior in which a plurality of filter bags (50) are disposed to partially clean a gas stream. The gas stream is communicated to the bag filters (50) through an air intake (46). The air intake (46) is in the form of perforations in the side walls (44) of the filtering station (10). The station (10) includes HEPA-filters (60) which receive the partially-cleaned air from the bag filters (50). The HEPA-filters (60) clean the air to a clean-room environment. A fan (30) draws a constant volume of air through the filtering station (10) and exhausts the clean air into the room. In operation, a constant volume of air is drawn into the filtering station through the side intake panels. The air is communicated to a first filter station which is in the form of bag filters. The air is then passed through a HEPA-filter stage for further cleaning and exhausted to the room.

16 Claims, 7 Drawing Figures

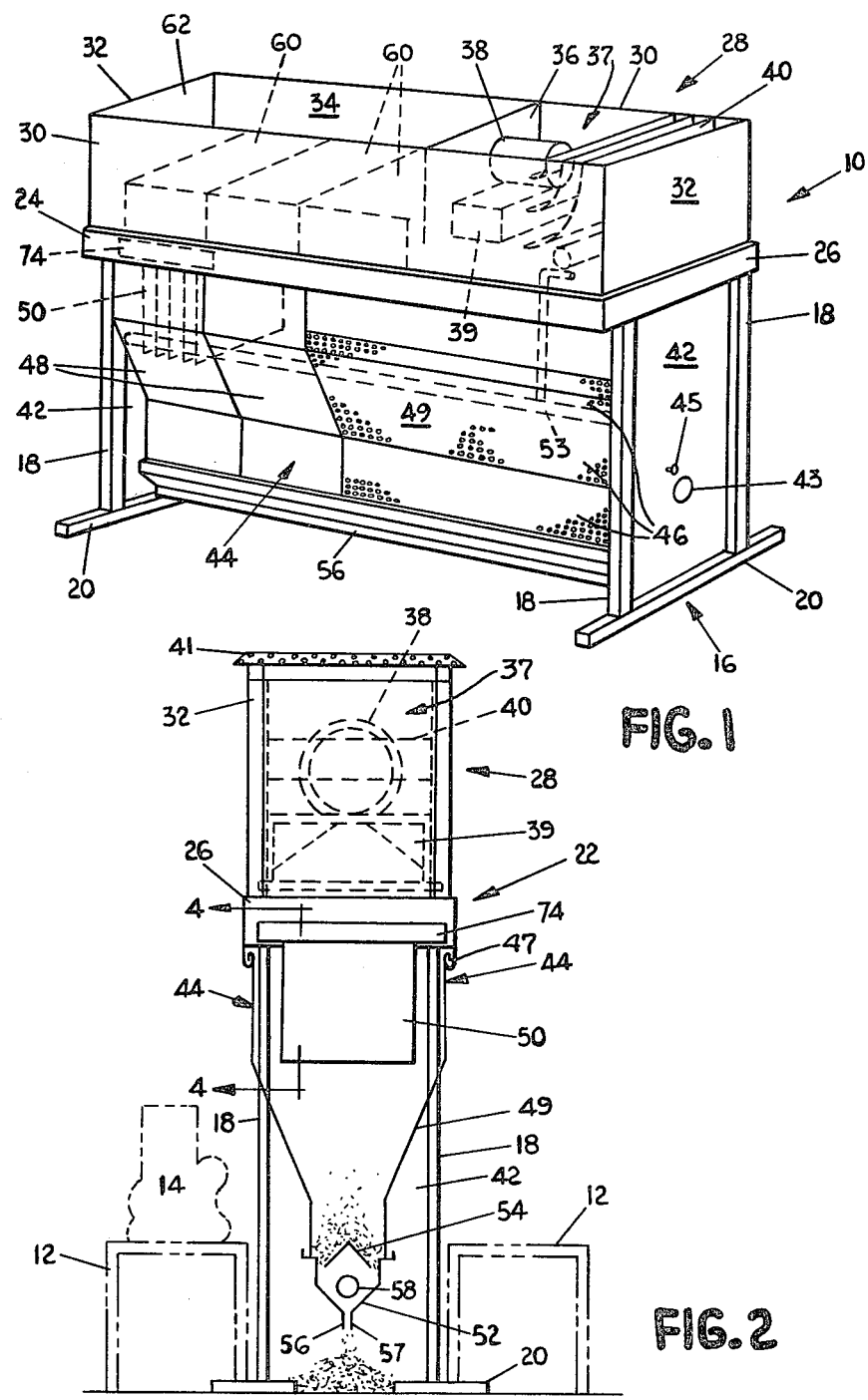

4,333,745

WORKBENCH FILTERING STATION AND METHOD

FIELD OF THE INVENTION

The invention relates to a workbench filtering device wherein dirt-laden air is cleaned by passing through a first filtering stage including filter bags and a second filtering stage including HEPA-type filters.

BACKGROUND OF THE INVENTION

State of the Prior Art

In many working environments, a large amount of dust and particulate matter is generated during the production of a product. One such case, for example, is in the machining of castings or the like wherein the machining of a partially finished product generates a large amount of dust and particulate material. This machining, which often involves the use of grinders, pneumatic chisels and the like, causes a large quantity of metal particles to be generated which are then dispersed in the ambient air within a factory.

One solution to the problem of removing these particles from the air is to provide a central exhaust air filtering system in the factory. These central filtering systems require a large draft system for moving the air through the duct work. Duct work, fans, registers and the like are needed and are usually permanently mounted within a factory. A fixed or central air filtering system, therefore, does not provide flexibility if the machining operation or the layout of the factory are changed. Additionally, such a system requires a comprehensive maintenance program to ensure that the filtering system does not break down or otherwise malfunction during operation.

In response to the infeasibility of central air filtering systems for factories, a number of small filtering devices which may also serve as a workbench or are placed adjacent to a work area have been designed and put into use. One such workbench filter is disclosed in the Mackey U.S. Pat. No. 3,295,298 patent, issued Jan. 3, 1967. The Mackey patent discloses a dust-collecting down-draft bench wherein the horizontal surface of the device provides a work surface. Disposed beneath this work surface, which is in the form of a grate, are a plurality of filter bags which clean air as it is forced through the filter device.

Another form of workbench filter station is shown in the Wolverine Equipment Division publication entitled "Welding/Smokebench". The Wolverine bench includes a horizontal grate which functions both as a work surface and as an inlet for dirt-laden air. The air is passed through a first prefiltering station including fiberglass filters and then to a HEPA-filter and exits through a top exhaust grate. Another Wolverine Equipment Division product similar to that described above is a grinding bench which includes a series of metallic prefilters. Air passing through these filters is then communicated to high efficiency filters before returning to the room. The filtering efficiency of this workbench is said to be 99.7% at 5 microns or larger. Other known workbench filtering devices include a horizontal grate which communicates to a box in which a plurality of filter bags are disposed in a manner similar to that described in the Mackey '298 patent.

The Austin U.S. Pat. No. 4,016,809 patent issued Apr. 12, 1977, discloses a clean air workbench including a HEPA-filter which provides clean air to a work station. The workbench includes a first filtering stage which supplies partially cleaned air to the HEPA-filter. This clean air is then supplied to a hood which is used to perform a task requiring a clean room atmosphere.

While the above described filter devices do remove particulate matter from air which is generated during a metal working process, for example, they do have some drawbacks. The use of a down draft workbench, such as disclosed in the Mackey '298 patent and the Wolverine Equipment publications, will create an updraft or a slightly reduced pressure area above the workbench. The fine particles generated during the machining process may become entrained in this reduced pressure area and therefore drawn away from the inlet to the filter device. The capture of these fine particles is essential to providing a clean atmosphere for a worker in order to protect the worker's health.

DESCRIPTION OF THE INVENTION

In accordance with the present invention, a filtering device is placed adjacent a work area so as to draw in dirt-laden air generated at the work area for filtering with a subsequent discharge of clean air to the factory. The filtering device comprises an upright support frame from which a first pair of parallel panels are suspended. At least one of the panels includes an air intake means for drawing air into the filtering device. A second pair of parallel vertical panels are secured to the frame perpendicular to the first panels so as to define an enclosed space. The filtering device includes a fan or blower which provides for a constant volume gas flow through the filter. The fan maintains a selected pressure through the filtering device and is disposed downstream of the second filter stage. The first filtering stage includes a plurality of filter bags which are arranged in the open interior formed by the vertical panels. This bag filter arrangement cleans the dirt-laden gas flow to a desired particulate level. A second filtering stage including HEPA-type filters for further cleaning the air to approximately a 99.99% particulate-free gas stream is disposed downstream of the bag filters. After passing through the HEPA-type filters, the clean gas stream is exhausted into the room.

The vertical panels, which can include perforations for allowing the intake of dirt-laden air into the filters, can be pivotally suspended from the frame. In this way, the panels can be displaced if accidentally struck by a machining tool or a casting. The bag filters are hung in parallel with the perforated panels so that the entering gas stream is dispersed amongst the various bags for cleaning. The bag filters are mounted on a wire mesh frame having the same general configuration as the bags. When the blower is operating in the filtering device, the bags are drawn against the wire mesh frame.

Disposed beneath the bag filters is a hopper which collects dust and particles captured by the bags during the filtering operation. The hopper includes a baffle having an inverted V-shape which creates a low pressure area so as to prevent reentrainment of particles collected in the hopper. The particles collected in the hopper are removed through flaps which are opened upon depressurization of the filtering device, which occurs when the blower is shut down. To provide further cleaning of the hopper, a perforated tube extends therethrough so that a vacuum device may be attached to the tube for vacuuming particles out of the hopper through the tube. The exhaust from the filtering device can be provided with turning vanes which reduce the velocity of the exiting air and direct the airstream upwardly and horizontally away from the exhaust. In this way, the formation of eddy currents which would prevent dirt particles from being drawn into the filtering device is avoided.

In one configuration, the filtering device operates at a static pressure between 2½ and 6" at the blower outlet. At static pressures below 2½" and greater than 6", the blower will shut down to prevent overloading of the filters.

The above described filtering device provides an efficient unit for cleaning dirt-laden air which is produced during a machining operation, for example. The vertical intake panels permit the device to be positioned adjacent the work stations and thereby capture the dirt-laden air at its source. Additionally, the arrangement of the exhaust of the device at a level above the work station will avoid the capture of fine particles by the discharge flow before they are drawn in through the perforated panels. The two-stage filtering process also cleans the air to a clean-room environment having a greater than 99.99% particulate-free airstream.

BRIEF DESCRIPTION OF THE DRAWINGS

The invention will be described with reference to the accompanying drawings wherein like members bear like reference numerals in which:

FIG. 1 is a perspective view of a filtering device in accordance with the present invention with the top perforated panel removed;

FIG. 2 is an end view of FIG. 1 with an end wall removed;

DETAILED DESCRIPTION OF THE PREFERRED EMBODIMENT

Figure 3:
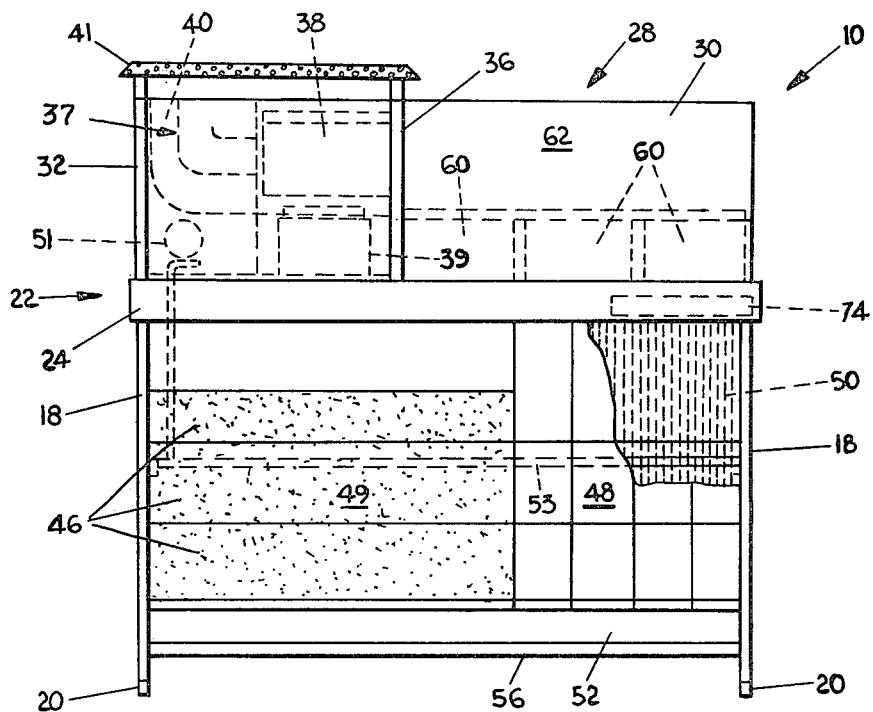
FIG. 3 is a side view of the filtering device of FIG. 1 with a portion cut away to show the interior thereof.

With reference to FIGS. 1-3, a filtering device 10 in accordance with the invention may be disposed adjacent a work area or workbench 12 or conveyor on which an object to be machined, such as a casting 14, is placed. The machining operation generally includes the use of grinders, pneumatic chisels and the like so that metal particles and dirt generated during the machined process are dispersed into the ambient air. Placing of the filtering device 10 adjacent the work area therefore will enhance capture of these particles.

The filtering device 10 comprises a frame 16 including upright legs 18 and horizontal cross members 20 which form the base of the filtering device 10. The legs 18 and the cross members 20 form an open framework. The top portion of the legs 18 support a plenum 22 including side members 24 and end portions 26. The plenum 22 in turn supports a top housing 28 including side panels 30, end panels 32 and a top panel 34 which form a closed space. Extending between the side panels 30 and perpendicular to the top panel 34 is an interior vertical panel 36. Disposed in an open chamber 37 formed by the interior vertical panel 36, one of the end panels 32 and side panels 30 is a blower or fan 38 which provides for a constant draft through the filtering device 10. The blower is driven by means of a motor 39 mounted adjacent the blower. Also disposed in chamber 37 are a plurality of turning vanes 40 disposed downstream of the exhaust of the blower 38. The turning vanes 40 direct discharge air of the filtering device 10 upwardly while reducing the velocity of the air stream. The top of the chamber 37 is closed by a perforated metal plate 41 which prevents airborne particles from settling onto the vanes 40 and clogging the blower 38.

The frame 16 supports end walls 42 which are secured between the upright vertical legs 18 in a fixed relationship. A duct 43 is disposed in one of the end walls 42 to provide access to the interior of the filtering device. Disposed adjacent to this duct 43 is a microswitch 45 which activates a vibrator 51 for cleaning the filtering elements disposed within the filtering device 10. The operation and function of the duct 43 and microswitch 45 will be described below.

Secured between the upright vertical legs 18 and perpendicular to the end walls 42 are side panels 44. The side panels 44 include a perforated section 46 and a solid section 48. The panels 44 are preferably made of sheet metal. The perforated section of the side panels 44 has a selected ratio of open area to solid area. For example, if it is desired to provide for an intake of 2000 cubic feet per minute through one panel, then the panel should have a ratio of 23% open area to solid area. Other ratios may be selected depending upon the volume of air to be drawn into the filtering device. Either one or both side panels 44 may include a perforated area. If both side panels 44 include such a perforated area 46, the filtering device 10 may be used with two workbenches 12 such as shown in FIG. 2.

A central portion 49 of the side panels 44 is angled and accordingly is set back from the plane of the vertical legs 18. By angling a portion of the side panel 44, the workbench 12 and, consequently, the casting or the like placed on the workbench 12 may be placed more closely to the filtering device 10 and therefore increase the capture efficiency of the device. The side panels 44 may also be pivotably mounted to the walls 24 of the plenum. In this way, the panels 44 are displaceable if struck by a machining tool or a casting. As shown in FIG. 2, the top edge of the side panel 44 includes a downwardly extending lip 47 which is received in a corresponding lip or flange on the side walls 24 of the plenum. This structure provides a hinge-like connection which permits displacement of the panel 44 when struck and provides easy access to the filters (to be described below) mounted within the filtering device.

The end walls 42 and side panels 44 which are supported on frame 16 form an enclosed interior space in which a first series of filter elements are disposed. A plurality of filter bags 50 are disposed in this interior space as shown in FIGS. 1-3. The bags 50 are arranged perpendicular to the plane in which the side panels 44 lie. In this way, the air flow entering the filtering device 10 is dispersed over all of the bags 50 in order to provide for an efficient cleaning operation. The number of filter bags 50 disposed in this interior space are selected in view of the air flow through the system and the desired cleaning efficiency. The filter bags 50 themselves are generally the size of a standard pillow case and may have dimensions of 30 inches by 19 inches. The depth of the bag is typically 1 inch. The bags may be treated with silicon, which functions as a flame retardant, in order to provide resistance to sparks. Such sparks may be generated during the machining process.

A typical filter bag will remove 95% of all particles one micron or larger. The particular manner in which the bags are mounted in the filtering device will be described below. Disposed beneath the bag filters 50 is a hopper 52 which extends the length of the side panels 44 and is secured between the vertical legs 18. The hopper 52 collects dirt captured by the filter bags 50 and released when the bags 50 are cleaned. The bags 50 themselves are cleaned in a conventional manner such as by connecting the bag supports or the bags themselves to a vibrator 51. The vibrator 51 is operatively connected to the bags by a transfer bar 53 mounted adjacent the bags.

Figures 4, 5:
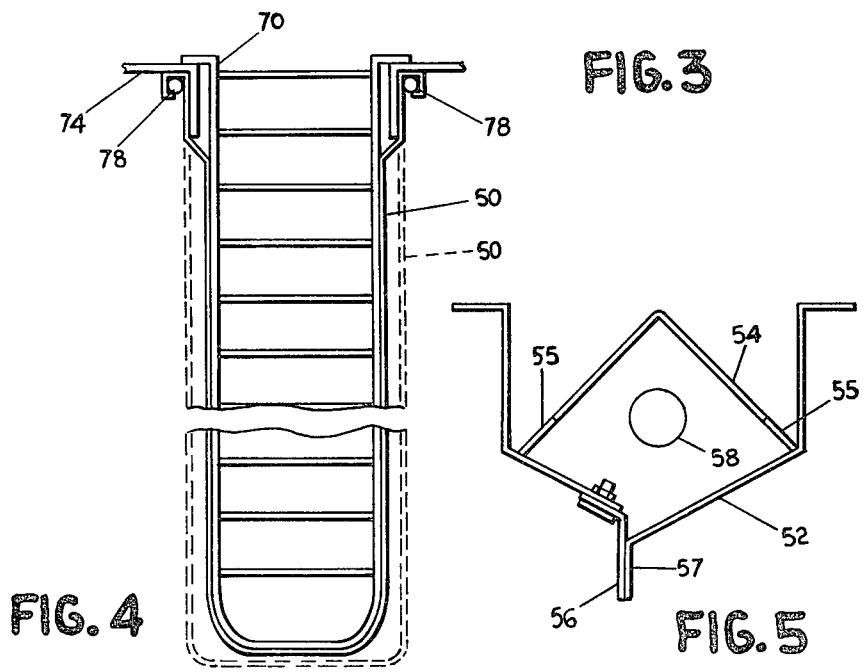
FIG. 4 is a cross-sectional view of a filter bag and a mesh screen support therefor taken along lines 4—4 of FIG. 2.
FIG. 5 is a detailed view of the hopper and baffle structure in accordance with the invention.

As shown in FIGS. 2 and 5, an inverted V-shaped baffle 54 is disposed in the hopper 52. The baffle 54 includes a series of spaced-apart slots 55 which permit passage of particles out of the baffle. The baffle 54 creates a low pressure area in the region of the hopper 52 in order to prevent reentrainment of particles captured in the hopper 52. The baffle 54 also prevents the formation of localized air currents which would cause particles to be swept out of the hopper and back into the filtering area. The bottom portion of hopper 52 is open and is sealed by means of a flap 56, which is preferably made of cloth, such as canvas or the like. The flap 56 seals against a rigid plate 57, with the plate and flap extending the full length of the hopper 52. When the filtering device is operational, the fan 38 creates a slight negative pressure which draws the flap 56 against the plate 57 to seal the hopper 52. Upon shut down of the fan 38, the pressure is equalized and the flap 56 is released, thereby opening the hopper and permitting particles captured therein to fall to the floor where they may be swept up or vacuumed.

In order to provide for further cleaning of the filter device, a perforated tube 58 extends along the length of the hopper 52. This perforated tube, having an access port 43 as shown in FIG. 1, allows for the insertion of a vacuum cleaning tool which may be used to vacuum particles from the filter device. The micro-switch 45 positioned adjacent the port 43 is actuated by means of the vacuum tool inserted through the port. Actuation of the switch 45 in turn triggers the operation of the vibrator 51 for shaking the bags clean. Cleaning of the bags is also achieved when the blower is shut down, so that the bags return to a relaxed state and thereby release heavy particles captured on the surface thereof.

A second filtering operation is provided within the filtering device 10 by the inclusion of a plurality of HEPA-filters 60 disposed in the top housing 28 of the device. The HEPA-filters 60 typically clean an air stream to greater than a 99.99% particle-free gas flow at a particle size of 0.5 microns. The HEPA-filters 60 are disposed in a plenum 62 formed by the side panel 30, end panel 32 and top panel 34 of the top housing 28. This panel arrangement provides access to the HEPA filters for servicing. The gas flow from the bag filters 50 is directed to the HEPA-filters 60 by means of the plenum 24 which is arranged between the two filtering stages. A HEPA-filter is a fiberglass media with aluminum separators wherein the fiberglass has a plurality of pores dispersed therein capable of filtering from the air a large quantity of particles having a size less than one micron. One such HEPA-filter which may be used is that manufactured by Velco International, Westland, Michigan.

Figure 7:
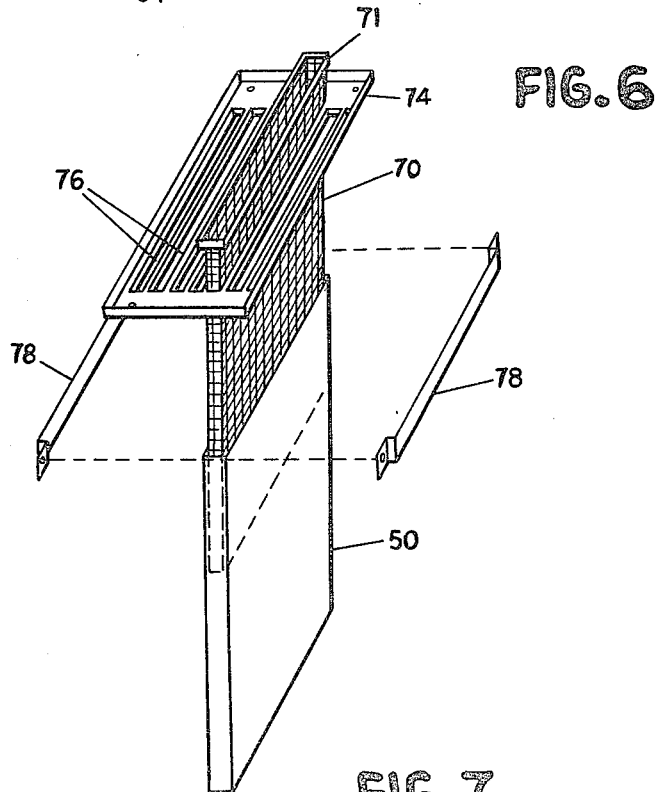
FIG. 7 is a perspective view of a filter bag support structure in accordance with the present invention.

With reference to FIG. 4, the particular mounting structure for the filter bags 50 is shown. The bags 50 are mounted on a mesh screen 70 having the general configuration of a bag. When the blower of the filtering device is not operating, the bag 50 is in a relaxed state and therefore is not drawn against the wire mesh. When the blower is actuated, the bag 50 is drawn against the mesh 70 with the mesh maintaining the walls of the bag 50 at a spaced distance thereby providing a path for air flow so that the particles are trapped on the outer surface of the bag. The mesh 70 also enhances a self-sealing action between the bag 50 and a mounting frame 74. The upper portion of the wire mesh 70 includes a lip 71 which is seated on a corresponding shoulder on the mounting frame 74 as shown in FIG. 7. Brackets 78 provide a clamping means for holding the bag in place over the wire mesh 70.

With reference to FIG. 7, the filter device 10 includes a plurality of mounting frames 74 for supporting the wire mesh 70 and filter bag 50 assembly. A number of the mounting frames 74 are secured in the filter device. In this way, sections of filter bags 50 may be replaced in an easy manner. The mounting frames 74 include a plurality of slots 76 in which the wire mesh 70 is inserted, with the lip 71 seated on the shoulder of the plates 74. The number of such frames 74 used in the filter device is selected in view of the desired filtering capacity of the device.

Figure 6:
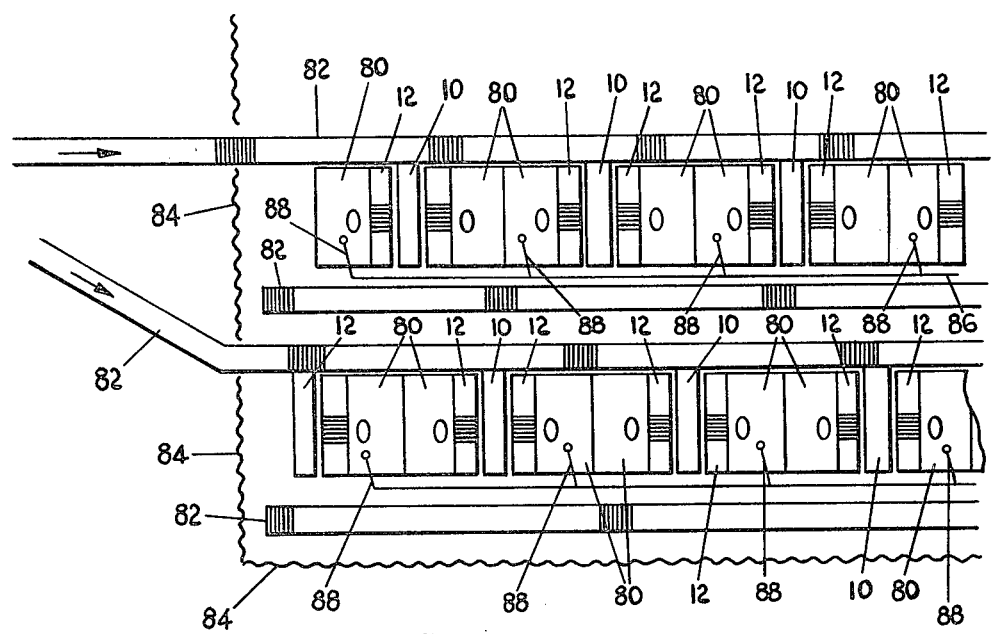
FIG. 6 is a schematic diagram of a factory or machining operation including a plurality of filtering devices in accordance with the present invention.

FIG. 6 shows a schematic view of a factory including a plurality of the filtering devices 10 in accordance with the invention. A number of work areas 80 are arranged in the factory and may include workbenches 12 such as shown in FIG. 2. Disposed between adjacent work areas 80 is a filtering device 10 in accordance with the invention. In such an arrangement, both side panels 44 of the filtering device 10 include perforations for allowing the intake of dirt-laden air into the device. Conveyors 82 are arranged adjacent the work stations in order to transport workpieces such as castings to each work station in a sequential operation. Vacuum lines are also arranged adjacent the work stations in order to provide a means for cleaning the work areas. In this regard, a main vacuum line 86 includes a plurality of take off lines 88 to which a vacuum cleaner attachment may be connected. The vacuum cleaner allows for the cleaning of the work area as well as cleaning of the hopper as described above. Since a machining operation generates a large amount of noise, the entire area may be enclosed by curtains 84 which will somewhat deaden sound transmission.

In operation, the filtering device is placed adjacent a workbench, such as shown in FIG. 2, wherein a grinding or machining operation takes place. As a worker operates a machining tool in order to finish a rough casting, a large quantity of metallic particles are given off. These metallic particles are drawn into the filtering device by means of the forced draft generated by the blower 38. The particles are drawn through the vertical side panels 44 which have a selected ratio of open air to solid area. The panels themselves, in view of the perforations, will function as a prefilter stage in that the perforations will cause large particles to be trapped against the side panels and drop to the floor. The invention thus provides a filtering device which will remove the minute or fine particles from the air stream. These small or fine particles may cause a health problem if inhaled.

Accordingly, many manufacturers have sought to eliminate these particles in order to comply with the health and safety requirements of the state and Federal governments.

The dirt-laden air stream which is drawn in through the side panels of the filtering device then passes into the closed space formed by the end walls and panels. The forced air draft provided by the fan distributes the air stream over the plurality of filter bags disposed in the filtering device. The filter bags typically have a cleaning efficiency of 95% at a particle size of one micron so that a large portion of the larger particles in the air stream are removed prior to passing through the second HEPA-filter stage. The particles are collected on the outer surfaces of the bags with the bags themselves drawn against the wire mesh screen due to the pressure generated by the blower. In one example of a filtering device, 70 such bags are disposed in the filter interior, each bag having a size of 30 inches by 19 inches by 1 inch and providing a collecting area of 8 square feet per bag. The collecting area to be provided by the bag filters it to be selected in view of the air flow through the filtering device as well as the expected quantity of dirt particles carried in the air stream and the desired cleaning efficiency.

The partially cleaned air which is exhausted from the filter bags is then communicated to the plenum 24 wherein the air stream then passes to the HEPA-filters 60. As shown in the drawings, three such HEPA-filters may be provided in the top housing. These HEPA-filters typically clean the air to a greater than 99.99% particulate-free air stream at a particle size of 0.5 microns. This filtering stage essentially provides a clean room environment and removes substantially all of the minute particles which may cause damage to a worker's lungs. The HEPA-filters as shown in the illustrated embodiment of the invention provide a total collecting area of approximately 234 square feet per filter.

The clean air exiting from the HEPA-filters is drawn out of the filtering device by means of the fan which is placed downstream of the HEPA-filters. The fan provides a constant volume air flow through the filtering device. This constant air flow insures an efficiently operated filtering mechanism as well as providing for the needed draft for drawing the dirt-laden air into the device. Additionally, the blower, in combination with the filters, maintains a desired static pressure at the blower outlet which prevents the filters from becoming overloaded. In this regard, a selected static pressure is maintained at the blower outlet wherein this pressure, when it reaches a desired level, causes the blower to shut off and thereby prevent overloading of the filters. In order to activate this shutdown of the fan a pressure gauge is placed at the discharge plenum of the HEPA filters. When the pressure gauge reaches a predetermined pressure level, the gauge actuates a switch which shuts off the fan.

The turning vanes disposed at the discharge end of the blower direct the clean air stream upwardly and laterally into the factory or working environment. In this way, the clean air will not discharge directly into the work area at a high velocity and disperse dirt-laden air into the room and away from the intake to the filtering device. Additionally, the turning vanes will slow the velocity of the exiting air so as to prevent the formation of currents which will entrain fine particles and prevent the intake thereof into the filter.

The wire mesh screen which supports the bag also provides another function to insure constant operation of the filter-like device. In the past, if one of the filter bags tore, a low pressure area would be created through which the air stream in the filtering device would exit and therefore the air would not pass equally through any of the remaining filters. In distinction, the wire screen causes all of the bags to collapse or be drawn against the screen equally. Accordingly, the sides of a ruptured bag will be maintained apart so that no low-pressure path will be formed through which a large volume of the dirt-laden air can escape.

The hopper provided in the filter device including pressure actuated flaps also provides an easy means for cleaning the filter device without the need for a complex hopper and conveyor mechanism. Since the hopper is, in essence, self-cleaning upon depressurization of the filter, which causes the flaps to open, the build up of particles in the hopper is avoided. The build up of such particles in the hopper, often caused by the failure to manually clean the filter device or the failure of a conveyor mechanism can reduce the efficiency of the filtering mechanism by rising to a level which would interfere with the bag filters.

The foregoing description and drawings are merely illustrative of the invention and are not intended to limit the invention to the above described embodiment. Variations and changes which may be obvious to one skilled in the art may be made in the invention without departing from the scope and spirit thereof as defined in the appended claims.

The embodiments of the invention in which an exclusive property or privilege is claimed are defined as follows:

1. A workbench filtering station comprising:
   an open support frame;
   a first pair of parallel, spaced vertical panels suspended from said support frame;
   a second pair of parallel, spaced vertical panels secured to said support frame and perpendicular to said first pair of panels;
   said first and second pair of vertical panels enclosing said open support frame to thereby define a generally open interior;
   gas flow inlet means provided on at least one of said panels for communicating with said open interior, said gas flow inlet means including a perforated area having a selected ratio of open area to solid area disposed on a portion of said at least one panel of said first pair of panels, said perforated area regulating the volume of air drawn into the generally open interior;
   first filter means having a first filtering efficiency arranged in said generally open interior and in communication with said gas flow inlet means for cleaning the gas flow to a first selected particulate level;
   second filter means having a filtering efficiency greater than said first filter means, said second filter means being supported on said frame and disposed in a chamber in fluid communication with said generally open interior so as to clean the gas flow to a second selected particulate level;
   fan means mounted on said frame for providing a constant volume gas flow through said generally open interior wherein said fan means maintains a selected static pressure at the outlet thereof; and exhaust means in communication with said chamber in which said second filter means is disposed for discharging a clean gas flow.

2. The filtering station of claim 1 wherein said perforated area is provided in a portion of both of said first pair of panels.

3. The filtering station of claim 1 wherein said first pair of panels are pivotably secured along a top horizontal edge thereof to said support frame so that said panels are free-swinging, thereby enabling said panels to deflect if struck.

4. The filtering station of claim 1 wherein said first filter means includes a plurality of filter bags having a filtering efficiency of 95% and arranged in parallel with said gas flow inlet means.

5. The filtering station of claim 4 wherein said filter bags are mounted on a wire mesh frame having the general configuration of said bags and whereas said gas flow forces said bags against said mesh frame in a close-fitting relationship.

6. The filtering station of claim 4 further including hopper means disposed below said filter bags for collecting particulate matter captured and released by said bags.

7. The filtering station of claim 6 wherein a baffle is arranged within said hopper means so that said baffle creates a low pressure area in said hopper means during operation of said fan means to prevent reentrainment of particulate matter collected in said hopper means.

8. The filtering station of claim 7 wherein said hopper means includes a closure means for selectively providing access to said hopper means, said closure means being maintained in a closed position by said low pressure area.

9. The filtering station of claim 8 wherein said hopper means includes a perforated tube arranged in an interior thereof, whereby particulate matter collected in said hopper means can be removed through said perforations by means of an external vacuum cleaning device.

10. The filtering station of claim 1 wherein said second filter means is a HEPA-type filter.

11. The filtering station of claim 1 wherein said exhaust means includes turning vanes for directing said clean gas flow upwardly from said station.

12. A method of filtering a gas flow in a filter device including at least one vertically arranged intake panel, said at least one vertically arranged intake panel including a plurality of perforations therein, a first filter stage having a plurality of bag filters, a second filter stage having HEPA-type filters, and a fan for providing a constant volume air flow through said filter device, said method comprising the steps of:

drawing a constant volume gas flow through the perforations in the intake panel so as to maintain a selected static pressure at the outlet of said filter device;

passing said gas flow through the first filter stage to clean the gas flow to a desired particulate concentration;

passing said partially-cleaned gas flow from said first filter stage through said second filter stage to further clean the gas flow to a desired particulate concentration; and exhausting said clean gas flow to the atmosphere.

13. The method of claim 12 wherein said selected static pressure is between 2½" and 6" of water.

14. The method of claim 12 wherein said first filter stage is constructed to provide a 95% particulate capture level and the step of passing the gas flow through the first filter stage cleans the gas flow to a particulate concentration of at least 95%.

15. The method of claim 12 wherein said second filter stage is constructed to provide a 99.99% particulate capture level and the step of passing said gas flow through said second filter stage cleans the gas flow to a particulate concentration of at least 99.99%.

16. The method of claim 12 including the step of reducing the velocity of the exhaust gas flow.

* * * * *